United States Patent
Shimada

(10) Patent No.: US 7,590,126 B2
(45) Date of Patent: Sep. 15, 2009

(54) FRAME TRANSFER PROCESSING METHOD AND DEVICE

(75) Inventor: Katsumi Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 517 days.

(21) Appl. No.: 10/964,753

(22) Filed: Oct. 14, 2004

(65) Prior Publication Data

US 2005/0286537 A1 Dec. 29, 2005

(30) Foreign Application Priority Data

Jun. 9, 2004 (JP) ............................. 2004-171593

(51) Int. Cl.
*H04L 12/28* (2006.01)
*H04L 12/56* (2006.01)
(52) U.S. Cl. .................. 370/401; 370/395.53
(58) Field of Classification Search ........................ None See application file for complete search history.

(56) References Cited

U.S. PATENT DOCUMENTS 6,198,723 B1* 3/2001 Parruck et al. ............ 370/230.1
2005/0198371 A1* 9/2005 Smith et al. .................. 709/238

FOREIGN PATENT DOCUMENTS

JP 2003-500926 1/2003
WO WO 00/72523 11/2000

* cited by examiner

*Primary Examiner*—Ayaz R Sheikh
*Assistant Examiner*—Sori A Aga
(74) *Attorney, Agent, or Firm*—Katten Muchin Rosenman LLP

(57) ABSTRACT

In a frame transfer processing method and device, information indicating a flooding destination is preset for every physical transmission line and every VLAN when a plurality of VLANs are accommodated in a single logical transmission line where physical links are aggregated, a single transmission line is set to be used when a flooding frame is transferred to the transmission line where the links are aggregated, and the flooding destination is changed per physical link without operating the information indicating the flooding destination for every VLAN when the transmission line has failed.

8 Claims, 9 Drawing Sheets

| DESTINATION MAC ADDRESS | SOURCE MAC ADDRESS | PAYLOAD | FCS |
|---|---|---|---|

| DESTINATION MAC ADDRESS | SOURCE MAC ADDRESS | VLAN TAG | PAYLOAD | FCS |
|---|---|---|---|---|

LA
LINK AGGREGATION-TRANSMISSION LINE

FRAME TRANSFER PROCESSING METHOD AND DEVICE

BACKGROUND OF THE INVENTION

1. Field of the Invention

The present invention relates to a frame transfer processing method and device, and in particular to a method and device for transferring a frame by a flooding method through a layer 2 switch which determines a transfer destination port based on a VLAN (Virtual Local Area Network) and a MAC (Medical Access Control) address.

2. Description of the Related Art

A layer 2 (hereinafter, occasionally abbreviated as L2) switch having a plurality of input/output communication interfaces (hereinafter, referred to as physical ports) has a function of voluntarily learning path information indicating a transfer destination of a MAC frame. Namely, this is a function of learning the source MAC address of a MAC frame and the location of a port having received the MAC frame, and of then determining a port to which the MAC frame should be transmitted by using the information already learned when another port receives a frame having a destination MAC address which is the same MAC address as one previously learned.

Also, the L2 switch having a VLAN function learns the MAC address and VLAN identifying information (hereinafter, occasionally referred to as VLAN-ID) in combination. For such a system, a specification is described in IEEE802.1d as a method of learning and forwarding (transferring) by the VLAN and the MAC address.

For another technology of the layer 2 switch, there is mentioned a function of binding a plurality of physical links to be used as a single logical transmission line. This is called a link aggregation function. By using this function, the transfer of data amounts exceeding a bandwidth of a single physical link between two L2 switches is made possible. Also, even if any physical link among the bound aggregated links fails, the arrangement of the logical link is changed or switched to use remaining normal physical links, thereby enabling an operation to be continued. The specification of this system is described in IEEE802.3ad.

Thus, when no frame is transferred between certain end stations (terminals) and when a fixed time elapses after learning and the learned contents become disabled, the L2 switch assumes a state where nothing has been learned. In such a state where no MAC address has been learned, a frame is required to be transferred to all of the ports belonging to the same VLAN. This function is called "flooding". How to perform the "flooding" function will now be described by referring to operations of "learning" and "frame forwarding by learned information".

Network Arrangement (1)

It is supposed that a network shown in FIG. 3, for example, is structured. An L2 switch 100 has ports represented by #Pn, where n is supposed to be a port No. It is to be noted that hereinafter, a word "port" is used as a synonym of "physical link". In this example, it is arranged that among five physical ports shown by #P1-#P5, the ports #P1, #P2, and #P4 belong to a VLAN 501 indicated by VLAN-ID=501, and the ports #P3 and #P5 similarly belong to a VLAN 601 indicated by VLAN-ID=601. It is to be noted that a terminal 11 (MAC address=11) is connected to the port #P1, a terminal 12 (MAC address=12) is connected to the port #P2, a terminal 13 (MAC address=13) is connected to the port #P3, a terminal 14 (MAC address=14) and a terminal 15 (MAC address=15) are connected to the port #P4, and a terminal 16 (MAC address=16) is connected to the port #P5 respectively.

The arrangement of the VLAN is stored in a memory (not shown) within the L2 switch 100 in the form of representing with 1 bit whether or not each port belongs to the VLAN for every VLAN-ID, as shown by the following table T101 and a bitmap arrangement of a port in FIG. 4A.

TABLE T101

| VLAN-ID | BITMAP OF PORT |
| --- | --- |
| . | . |
| . | . |
| . | . |
| 501 | 11010 |
| . | . |
| . | . |
| . | . |
| 601 | 00101 |
| . | . |
| . | . |
| . | . |

Also, in order to obtain a VLAN to which a frame is attributed when a frame is received at each port, a VLAN-ID allocated to the received frame is set for every port as shown by the following table T102.

TABLE T102

| PORT NO. | VLAN-ID ALLOCATED TO RECEIVED FRAME |
| --- | --- |
| 1 | 501 |
| 2 | 501 |
| 3 | 601 |
| 4 | 501 |
| 5 | 601 |

A frame transfer processing operation by the L2 switch 100 will now be described referring to a flowchart of FIG. 5. It is to be noted that this flowchart is executed by an exclusive logical circuit, CPU, or the like (not shown) installed in the L2 switch 100, which applies to the following description.

Firstly, the terminal 11 transmits a frame whose destination address is "14" and source address is "11" in a format shown in FIG. 6A. The L2 switch 100 monitors a frame received at step S1 to receive the frame at port #P1 (at step S2). A correspondence between the reception port of the frame and the VLAN-ID is preset in the L2 switch 100 by the table T102 described above.

At step S3, the VLAN to which the frame belongs is obtained based on the reception port by using the table T102. Since the table T102 indicates that the frame received at the port #P1 belongs to the VLAN 501 of the VLAN-ID=501, the VLAN-ID=501 is derived at step S3.

At step S4, the No. "1" of the port having received the frame is learned with the VLAN-ID obtained at step S3 and the source address of the frame as keys. The result of the learning is prepared as following table T103.

TABLE T103

| VLAN-ID | MAC ADDRESS | PORT NO. |
| --- | --- | --- |
| . | . | . |
| . | . | . |
| . | . | . |
| 501 | 11 | 1 |
| . | . | . |

TABLE T103-continued

| VLAN-ID | MAC ADDRESS | PORT NO. |
|---------|-------------|----------|
| . | . | . |
| . | . | . |

Namely, since the received frame has the VLAN-ID=501, the source address=11, and the reception port=1, a single entry in the table as shown in the above table T103 is prepared.

At step S5, whether or not the port No. is learned is searched or checked with the VLAN-ID=501 and the destination address=14 of the received frame as keys. For this search, the above-mentioned table T103 is searched again to determine whether or not any hit is found (at step S6). Since the port No. has not been learned yet, no hit is found, so that the process proceeds to step S7.

At step S7, in order to check the port composing the VLAN, bitmaps of all the ports corresponding to the VLAN-ID=501 are obtained referring to the above-mentioned table T101, whereby it is recognized that the ports #P1, #P2, and #P4 belong to the VLAN 501.

At step S8, the frame is outputted from the obtained ports one after another. However, since the port having received the frame does not transmit the frame, the frame is transmitted from the ports #P2 and #P4. Thus, when the destination has not been learned, the frame is transferred to all of the ports belonging to the same VLAN except for the port having received the frame (at step S9). This is called a "flooding" function. As a result, the destination terminal 14 connected to the port #P4 can receive the frame transmitted by the source terminal 11. Although other terminals 12 and 15 receive the same frame, the destination address is not coincident with the MAC address of their own. Therefore, the frame is discarded.

An operation when the L2 switch 100 transfers a frame in the direction opposite (from right to left in FIG. 3) to the above-mentioned description will now be described. This is an operation in a case where the destination address is learned.

Firstly, when the terminal 14 transmits a frame having the destination address=11 and the source address=14, the L2 switch 100 monitors the frame reception at step S1 to receive the frame at the port #P4 (at step S2). The L2 switch 100 learns the port No. in the same way as mentioned above (at steps S3 and S4), and a table T103a, which is the table T103 in which the second entry is prepared, can be obtained as follows:

TABLE T103a

| VLAN-ID | MAC ADDRESS | PORT NO. |
|---------|-------------|----------|
| . | . | . |
| . | . | . |
| 501 | 11 | 1 |
| . | . | . |
| . | . | . |
| 501 | 14 | 4 |
| . | . | . |
| . | . | . |

At step S5, whether or not the port No. has been learned is searched with the VLAN-ID and the destination address of the received frame as keys. For this search, the above-mentioned table T103a is used again. Since the entry has been already learned with the VLAN-ID=501 and the MAC address=11 as keys, a hit is found, so that the process proceeds from step S6 to step S10.

Since it is recognized at step S10 that the output destination port=#P1 from the result of learning, the frame is outputted from the port #P1. Thus, the terminal 11 connected to the port #P1 receives the frame transmitted from the terminal 14.

On the other hand, the terminals 13 and 16 are also connected to the L2 switch 200, the frame transferred between the terminals 13 and 16 is transferred only to the terminal belonging to the VLAN 601, but not to the terminal belonging to a different VLAN, the VLAN 501. This is because a flooding destination is limited based on the setting of the above-mentioned table T101. By this function, data leakage to a different VLAN is prevented and data security is attained.

Network Arrangement (2)

How the flooding process is performed when a network is arranged by using a link aggregation function as shown in FIG. 7 will now be described.

Firstly, it is supposed that the network arrangement (2) of FIG. 7 is equivalent to the network arrangement (1) of FIG. 3 in which the L2 switch 100 is composed of L2 switches 200 and 300, and the arrangement of the terminals and the VLANs to which the terminals belong are the same as those in FIG. 3. Between the L2 switches 200 and 300, frames are transferred by using a logical link aggregation-transmission line LA in which physical links are bound between the ports #P4-#P6 of the L2 switch 200 and the ports #P1-#P3 of the L2 switch 300 by the link aggregation function. The locations of the ports and the number of ports form one example, so that it is possible to freely select the ports by the arrangement of the switch and to bind the links. This logical link aggregation-transmission line LA belongs to both of the VLANs 501 and 601, so that the VLAN frames for both of the VLANs 501 and 601 are transferred. Which VLAN the frame passing through the logical link belongs to is indicated by using the frame with a VLAN tag as shown in FIG. 6B. On the transmission side of the logical link, the VLAN tag is inserted upon outputting the frame, while on the reception side the VLAN tag is deleted after identifying the VLAN.

Frame Transferring Process by the L2 Switches 200 and 300 will now be Described along a Flowchart of FIG. 8.

The terminal 11 transmits the frame having the format as shown in FIG. 6B where the destination address=14 and the source address=11. The L2 switch 200 monitors the frame reception at step S1 to receive the frame at the port #P1 (at step S2). In the L2 switch 200, the reception port is associated with the VLAN-ID by the following table T104.

TABLE T104

| PORT NO. | VLAN-ID ALLOCATED TO RECEIVED FRAME* | PORT/TRUNK IDENTIFICATION (0: PORT, 1: TRUNK) | TRUNK NO. |
|----------|------|------|------|
| 1 | 501 | 0 | 0 |
| 2 | 501 | 0 | 0 |
| 3 | 601 | 0 | 0 |
| 4 | 0 | 1 | 20 |
| 5 | 0 | 1 | 20 |
| 6 | 0 | 1 | 20 |

*WHEN 0 IS SET TO VLAN-ID CORRESPONDING TO RECEIVED FRAME, IT IS INDICATED THAT THE PORT USES FRAME WITH VLAN TAG & VLAN IS NOT SPECIFIED.

However, a disabling value "0" is set as the VLAN-ID corresponding to the ports #P4-#P6 in the table T104. This set value "0" assumes that the frame transmitted/received at the ports #P4-#P6 of the L2 switch 200 uses the VLAN tag within the frame shown in FIG. 6B, and the VLAN is not specified corresponding to the ports.

At step S3, the VLAN to which the frame belongs is obtained by using the above-mentioned table T104. Since the table T104 indicates that the frame received at the port #P1 belongs to the VLAN 501 of the VLAN-ID=501, the VLAN-ID=501 is derived at step S3.

At step S4, the No. "1" of the port having received the frame is learned with the VLAN-ID obtained at step S3 and the source address within the frame as keys. Being the same arrangement as the above table T103, the result of the learning is omitted.

At step S5, whether or not the port No. is learned is searched with the VLAN-ID and the destination address of the received frame as keys. For this search, the same table as the table T103 is used again. Since the port No. has not been learned yet, no hit is found (at step S6), so that the process proceeds to step S7.

At step S7, in order to check the ports composing the VLAN, the following table T105 is referred to.

TABLE T105

| VLAN-ID | BITMAP OF PORT |
|---|---|
| . | . |
| . | . |
| . | . |
| 501 | 110100 |
| . | . |
| . | . |
| . | . |
| 601 | 001100 |
| . | . |
| . | . |
| . | . |

From this table T105, a bitmap of a port corresponding to the VLAN-ID=501 is obtained, whereby it is recognized that the ports #P1, #P2, and #P4 belong to the VLAN 501 of the VLAN-ID=501.

At step S8, the frame is outputted from the obtained ports one after another. However, the frame is not outputted from the port having received the frame. The frame is outputted from the ports #P2 and #P4 (at step S9). Since it is recognized from the above table T104 that the frame tag is to be inserted into the frame at the port #P4 (VLAN-ID=0), the VLAN tag is inserted into the frame outputted. As a result, the frame is transferred to the L2 switch 300 connected to the port #P4, and the terminal 14 can receive the frame transmitted by the terminal 11.

The above-mentioned flooding process is the same as that of FIG. 5 already described, so that usage of the link aggregation function is unnoticed. The reason why the same flooding process is enabled is that the above-mentioned table T105 is preliminarily composed by the method mentioned as follows.

The L2 switch 200 has a table defining the logical link arrangement composed by the link aggregation function as in the following table T106.

TABLE T106

| TRUNK NO. | NUMBER OF PORTS | PORT LIST (ARRANGED IN ASCENDING ORDER) |
|---|---|---|
| . | . | . |
| . | . | . |
| . | . | . |
| 20 | 3 | 4, 5, 6 |
| . | . | . |
| . | . | . |
| . | . | . |

A single logical link is called a trunk, to which a number is allocated for identification. In the network arrangement (2) of FIG. 7, for the L2 switch 200, the entries shown in the table T106 is prepared when the link aggregation-transmission line LA in which the trunk No. is "20" and the links of the physical ports #P4, #P5, and #P6 are bound are composed.

The ports #P1, #P2, #P4, #P5, and #P6 belong to the VLAN 501. If the bitmap of the ports is generated as it is when the above table T105 is composed, "110111" is obtained. However, since the ports #P4, #P5, and #P6 compose trunks, frames are overlapped if all of the ports #P4, #P5, and #P6 are made the flooding destination. Since the overlapping is against the operation of the link aggregation function, a mechanism for avoiding overlapping is required. A physical port composing a trunk and its trunk No. can be identified by referring to a port type (port/trunk identification) and the trunk No. in the above table T104. In order to avoid the overlapping of the frames at the ports #P4, #P5, and #P6, a list of the ports composing the trunk is checked by referring to the entry of the above table T106 based on the trunk No. "20", and the entry of the bitmap "110100" corresponding to the VLAN 501 is prepared in the table T105 so that only the top physical port of the list may become the flooding destination.

Thus, the flooding process can be done in the same way as the case of a normal port even if the link aggregation-transmission line LA is used. It is to be noted that since the trunk 20 also belongs to the VLAN 601, the entry of the VLAN-ID=601 is similarly arranged in the table T105 so that only the port #P4 within the trunk may assume the flooding destination.

Hereinafter, an operation after the frame transmitted from the terminal 11 is flooded to the port #P4 of the L2 switch 200 to be received at the port #P1 of the L2 switch 300 will be described referring to the flowchart of FIG. 8 again.

The L2 switch 300 monitors the frame reception at step S1, and receives the frame at port #P1 (at step S2). The L2 switch 300 preliminarily associates the reception port with the VLAN-ID by the following table T107.

TABLE T107

| PORT NO. | VLAN-ID ALLOCATED TO RECEIVED FRAME | PORT/TRUNK IDENTIFICATION (0: PORT, 1: TRUNK) | TRUNK NO. |
|---|---|---|---|
| 1 | 0 | 1 | 30 |
| 2 | 0 | 1 | 30 |
| 3 | 0 | 1 | 30 |
| 4 | 501 | 0 | 0 |
| 5 | 601 | 0 | 0 |

At step S3, the VLAN to which the frame belongs is obtained by using this table T107. Since this table T107 exhibits that the VLAN-ID corresponding to the port #P1 is set to "0" and the frame received from the L2 switch 200 is determined by the VLAN-tag (see FIG. 6B) within the frame, it is recognized that the received frame belongs to the VLAN 501 of the VLAN-ID=501 referring to the VLAN-tag of the received frame, and then the VLAN tag is deleted.

At step S4, a path having received the frame is learned with the VLAN-ID obtained at step S3 and the source address of the frame as keys. The result of this learning is "30" that is the No. of a trunk having received the frame as shown in the following table T103b.

TABLE T103b

| VLAN-ID | MAC ADDRESS | PORT/ TRUNK NO. | PORT/TRUNK IDENTIFICATION (0: PORT, 1: TRUNK) |
|---|---|---|---|
| . | . | . | . |
| . | . | . | . |
| . | . | . | . |
| 501 | 11 | 30 | 1 |
| . | . | . | . |
| . | . | . | . |
| . | . | . | . |
| 501 | 14 | 4 | 0 |
| . | . | . | . |
| . | . | . | . |
| . | . | . | . |

Also, information "1" for identifying that the trunk has received the frame is entered in the table T103b.

At step S5, whether or not the port No. has been learned is searched with the VLAN-ID and the destination address of the received frame as keys. For this search, the above table T103b is used again. Since the port No. has not been learned yet, no hit is found (at step S6), so that the process proceeds to step S7.

At step S7, in order to check the port composing the VLAN, the bitmap of the port corresponding to the VLAN-ID=501 is obtained referring to the following table T108, whereby it is recognized that the ports #P1 and #P4 belong to the VLAN 501.

TABLE T108

| VLAN-ID | BITMAP OF PORT |
|---|---|
| . | . |
| . | . |
| . | . |
| 501 | 10010 |
| . | . |
| . | . |
| . | . |
| 601 | 10001 |
| . | . |
| . | . |
| . | . |

At step S8, the frame is outputted from the obtained ports one after another. However, when the trunk has received the frame and the output destination port belongs to the same trunk, the frame is not outputted from the port. Therefore, the frame is not outputted from the port #P1. This determination is performed by using the setting of the above table T107. Namely, it is stored as the information of the frame that the received port is a trunk 30. As mentioned above, the ports #P1 and #P4 are set as the output destinations for the VLAN-ID=501 from the bitmap of the table T108. When the output destination of the frame is the port #P1, it is recognized that the port belongs to the trunk 30 by referring to the table T107. Since it is the same trunk, the frame is not outputted from the port #P1. Thus, the received frame is outputted from the port #P4 of the L2 switch 300. As a result, the terminal 14 receives the frame transmitted by the terminal 11.

An operation when the L2 switches 200 and 300 transfer a frame in the opposite direction (from right to left in FIG. 7) to the above-mentioned description will now be described. This is an operation in a case where the destination address is learned.

Firstly, when the terminal 14 transmits a frame whose destination address=11 and source address=14, the L2 switch 300 monitors the frame reception at step S1 to receive the frame at the port #P4 (at step S2). At step S3, the VLAN of the frame is obtained based on the reception port No.

At step S4, the L2 switch 300 learns the port No. in the same way as described above, and the second entry is prepared as shown in the above table T103b.

At step S5, whether or not the destination has been learned is searched with the VLAN-ID and the destination address of the received frame as keys. For this search, the above table T103b is used again. Since the entry with the VLAN-ID=501 and the MAC address=11 as keys has already been learned, a hit is found, the process proceeds from step S6 to step S11, and the learned port is obtained from the table T103b. By the result of this learning, it is recognized that the output destination is a trunk (port/trunk identifying information="1"), and its No. is "30" (at steps S11 and S12). In the case of a trunk, the process proceeds to step S13, where hashing operation is performed in order to select a single physical port as an output destination from among physical ports composing the trunk. For this purpose, the following table T109 is used to obtain that the number of ports in the trunk is "3".

TABLE T109

| TRUNK NO. | NUMBER OF PORTS | PORT LIST (ARRANGED IN ASCENDING ORDER) |
|---|---|---|
| . | . | . |
| . | . | . |
| . | . | . |
| 30 | 3 | 1, 2, 3 |
| . | . | . |
| . | . | . |
| . | . | . |

As an example of the hashing operation, such a method is used that a remainder calculation is performed by the number of ports to the result of the addition of the destination address and the source address of the frame, in which the first port is made an output destination if the result is "0", and the second port is made an output destination if it is "1". Since frames transferred between certain specific end stations are to be transferred through the same physical link at all times by this method, the order of frames can be prevented from changing.

As a result, the frame is outputted from any one of the ports #P1-#P3 of the L2 switch 300 (at step S14) to reach the L2 switch 200. If the port No. is one of "1"-"3" in this example, it is recognized from the above table T107 that the VLAN tag is inserted into the frame to be transmitted. Being the same as that already described, the subsequent operation of the L2 switch 200 is omitted. However, the table used at steps S11 and S12 in the L2 switch 200 at this time is the following table T103c.

TABLE T103c

| VLAN-ID | MAC ADDRESS | PORT/ TRUNK NO. | PORT/TRUNK IDENTIFICATION (0: PORT, 1: TRUNK) |
|---|---|---|---|
| . | . | . | . |
| . | . | . | . |
| . | . | . | . |
| 501 | 11 | 1 | 0 |
| . | . | . | . |
| . | . | . | . |
| . | . | . | . |
| 501 | 14 | 20 | 1 |
| . | . | . | . |
| . | . | . | . |
| . | . | . | . |

As a result, the terminal 11 receives the frame transmitted by the terminal 14.

On the other hand, there are a method and device for trunking multiple ports in a network switch by which a network switch configured for switching data packets across multiple ports uses an address table to generate frame forwarding information, a decision-making engine checks the frame forwarding information to determine whether the frame is to be forwarded to a port that is part of a trunk, and the decision-making engine determines the port which is to become the transmitting destination of the frame when the frame is to be outputted to a trunk port (see e.g. patent document 1).

[Patent Document 1]
Japanese Translation of PCT International Application No. 2003-500926

Problem 1

As described above, when the flooding process is performed to the trunk, a bit of only a single port among the ports composing the trunk is made "1" as shown in table T105, only to which the flooding is performed. A port of the trunk set for the flooding port is set as follows: A port list in which port Nos. are arranged in ascending order is prepared, and the smallest No. among the ports in a state where the communication with the opposing terminal is possible (link-up state) is set to be used. Since such a setting has a complicated logic, it is general that the L2 switch mounts thereon a CPU and a memory to operate the firmware for setting the port. If the trunk accommodates a plurality of VLANs, setting for each VLAN is performed.

When a failure occurs at the flooding port and the communication is disabled, a flame to be flooded is not transferred if the failure remains unaddressed. Therefore, it is required to reset another port of the trunk for the flooding. This setting is performed by firstly making the bit, which is corresponding to the port having been set, "0", and by making a bit corresponding to a port newly used as a representative port "1".

Processing upon port's failure will now be described referring to flowchart shown in FIG. 9.

Firstly, the L2 switches 200 and 300 monitor a port's failure at steps S21 and S22. If a failure occurs, whether or not the port belongs to the trunk is checked at step S23. For this purpose, setting as shown in the above tables T104 and T107 is used.

If the port belongs to the trunk, whether or not the port is coincident with the flooding port is checked at step S24. For this purpose, the above table T106 is used.

If the port is coincident with the top port arranged in ascending order, it is the flooding port. Therefore, bitmap setting for flooding at an object port for every VLAN is canceled in the table T105 (step S25). This processing is repeated for every VLAN to which the trunk belongs (at steps S26 and S25). Which VLAN the trunk belongs to can be obtained by referring to e.g. the setting of the following table T110.

TABLE T110

| TRUNK NO. | BITMAP BELONGING TO VLAN |
|---|---|
| . | . |
| . | . |
| . | . |
| 20 | 00 ... 010 ... 010 ... 00 |
| . | . |
| . | . |
| . | . |

(502nd & 602nd ONES FROM LEFT ARE "1")

An example of this table T110 exhibits that the trunk 20 belongs to the VLANs 501 and 601. It is to be noted that the following table T110a can be obtained in the case of the L2 switch 300.

TABLE T110a

| TRUNK NO. | BITMAP BELONGING TO VLAN |
|---|---|
| . | . |
| . | . |
| . | . |
| 30 | 00 ... 010 ... 010 ... 00 |
| . | . |
| . | . |
| . | . |

(502nd & 602nd ONES FROM LEFT ARE "1")

In order to remove the port in which a failure has occurred from the trunk, the port list is updated at step S27. This updating is performed to the above table T106. The top port after the updating is obtained at step S28, and a new flooding port is set for every VLAN at step S29. This setting is performed at the table T105 in the same way as the canceling. This is performed to all of the VLANs accommodated in the trunk (at step S30).

On the other hand, when the failed port is not coincident with the flooding port at step S24, the port list is updated at step S31 in the same way as step S27 to end the process.

Since the above-mentioned setting at steps S25 and S29 is performed by firmware for every VLAN, it takes much time for setting if the trunk belongs to numerous VLANs. When there are numerous VLANs, from several hundreds to several thousands of VLANs are accommodated in some cases. Until the time comes when such a setting is changed, a frame whose destination has not been learned is discarded without being transferred to the new flooding port. Since the communication is disabled during the setting for a user's standpoint, it has been an object to minimize a setting time.

Problem 2

Another problem for switching the flooding port is as follows:

Network Arrangement (3)

Firstly, supposing that the L2 switch as shown in FIG. 7 has a plurality of slots in a chassis, and a single line unit is inserted per slot to be used, the single line unit can have a plurality of physical ports and can use a plurality of line units, while a single trunk can be arranged across a plurality of line units.

FIG. 10 shows such a network arrangement (3). In this example, L2 switches 400 and 500 respectively have three line units U1-U3. The L2 switches 400 and 500 are connected with trunks 20 and 30 of the link aggregation-transmission line LA composed of five physical links, the 1st-3rd physical links among them connect the ports #P1-#P3 of the line unit U2 in the L2 switch 400 to the ports #P1-#P3 of the line unit U1 in the L2 switch 500, and the 4th and 5th physical links connect the ports #P1 and #P2 of the line unit U3 in the L2 switch 400 to the ports #P1 and #P2 of the line unit U2 in the L2 switch 500.

When a failure is detected at the port #P1 of the line unit U2 in the L2 switch 400 in this example, upper digits as a unit No. and lower digits as a port No. within the unit are arranged in ascending order and the port in subsequent operation is selected, thereby obtaining the port #P2 of the line unit U2 as a port newly used for flooding.

If a failure has occurred in the line unit U1 itself in the opposing L2 switch 500 at this time, a failure is also subsequently detected in the port #P2 of the line unit U2 in the L2 switch 400 newly selected for the flooding port. Therefore, the switching of the flooding port is required again. Such a switching is repeated until the port #P1 of another line unit U3 in the L2 switch 400 is selected for the flooding port. Thus, since it takes much time until the flooding frame is transferred again and the communication is interrupted in the meantime, it has been an object that the setting time is reduced.

SUMMARY OF THE INVENTION

It is accordingly an object of the present invention to provide a frame transfer processing method and device by which an interruption time of communication is minimized by shortening a switching time of flooding ports when a port's failure occurs in a link aggregation-transmission line, in view of the above-mentioned problems.

In order to achieve the object for the above-mentioned problem 1, in the present invention, a frame transfer processing method for transferring a frame through a link aggregation-transmission line which aggregates a plurality of physical links connecting switches to be used as a single logical transmission line, comprises: a first step of setting a single physical link among the link aggregation-transmission line to be used for flooding for every physical link and every VLAN, upon accommodating a plurality of VLANs in the link aggregation-transmission line; and a second step of changing a flooding destination per link upon failure of the link without changing the flooding destination for every VLAN.

The second step may be further provided with a step of setting the failed link disabled when the failed link belongs to a trunk composing the link aggregation-transmission line and is a present flooding destination, and of setting another link composing the trunk as the flooding destination.

Also, in order to achieve the object for the above-mentioned problem 2, in the frame transfer processing method of the present invention, when each switch is composed of a plurality of line units, and the link aggregation-transmission line is used across a plurality of line units, the second step may be further provided with a step of setting the failed link disabled when the failed link belongs to a trunk composing the link aggregation-transmission line and is a present flooding destination, and of setting a link of another line unit as a link newly used for the flooding destination.

Furthermore, the above-mentioned second step may be further provided with a step of decreasing a number of links composing the trunk by deleting the failed link upon setting the failed link disabled.

Namely, in the above-mentioned method of the present invention, it has become possible to select enabling/disabling of flooding-setting for all of the VLANs per physical link (port) in addition to flooding-setting per VLAN of the trunk. In other words, the flooding is set per VLAN in all of the links composing the trunk, and aside from this, the selection of enabling/disabling of the flooding-setting can be done for every physical link. This setting only makes the physical link which should become a flooding link enable and others corresponding to remaining physical links of the trunk disable.

When the flooding link is changed, the selection of enabling/disabling per physical link is changed, thereby enabling the flooding from a single link among the trunk. Accordingly, since it is not necessary to change the flooding-setting per VLAN, but is necessary only to set enabling/disabling per physical link, the switching time of a representative link can be minimized.

Also, the method of the present invention has a logic that when the flooding links are switched, a subsequent flooding link is selected so as to shift across the line unit. Namely, when a failure occurs in the flooding link, instead of arranging Nos. of the line units as well as links in e.g. the ascending order to make the link of the subsequent position the subsequent flooding link, it is selected from different line units. Thus, when a failure of the line unit occurs in an opposing device, a change of the flooding link can be completed by a one-time change, so that the interruption time of the communication by the switching can be minimized.

In a frame transfer processing device for realizing the above-mentioned method of the present invention, the device for transferring a frame through a link aggregation-transmission line which aggregates a plurality of physical links connecting switches to be used as a single logical transmission line, comprises: a first means of setting a single physical link among the link aggregation-transmission line to be used for flooding for every physical link and every VLAN, upon accommodating a plurality of VLANs in the link aggregation-transmission line; and a second means of changing a flooding destination per link upon failure of the link without changing the flooding destination for every VLAN.

The second means may be further provided with means of setting the failed link disabled when the failed link belongs to a trunk composing the link aggregation-transmission line and is a present flooding destination, and of setting another link composing the trunk as the flooding destination.

Also, when each switch is composed of a plurality of line units, and the link aggregation-transmission line is used across a plurality of line units, the second means may be further provided with means of setting the failed link disabled when the failed link belongs to a trunk composing the link aggregation-transmission line and is a present flooding destination, and of setting a link of another line unit as a link newly used for the flooding destination.

Also, the above-mentioned second means may be further provided with means of decreasing a number of links composing the trunk by deleting the failed link upon setting the failed link disabled.

As described above, according to the present invention, when the flooding is performed to a trunk in a network using a trunk of a link aggregation, time required for switching to a new link when a failure has occurred in a flooding link (port) can be minimized.

Namely, even if numerous VLANs are accommodated in a trunk, only the setting of enabling/disabling for every physical port has to be operated in order to change the flooding link, whereby it becomes possible to switch the flooding links in a short time since it is not necessary to change the setting for flooding per VLAN.

Also, when a single trunk is composed from a link of a plurality of line units, and even if a failure occurs per line unit at the opposing device, changing a flooding link can be performed with a single operation. Therefore, it becomes possible to switch the flooding link in a shorter time than the flooding link is shifted only in ascending order.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Operational Embodiment in Network Arrangement (2) (Problem 1)

Figures 6A, 6B, 7:
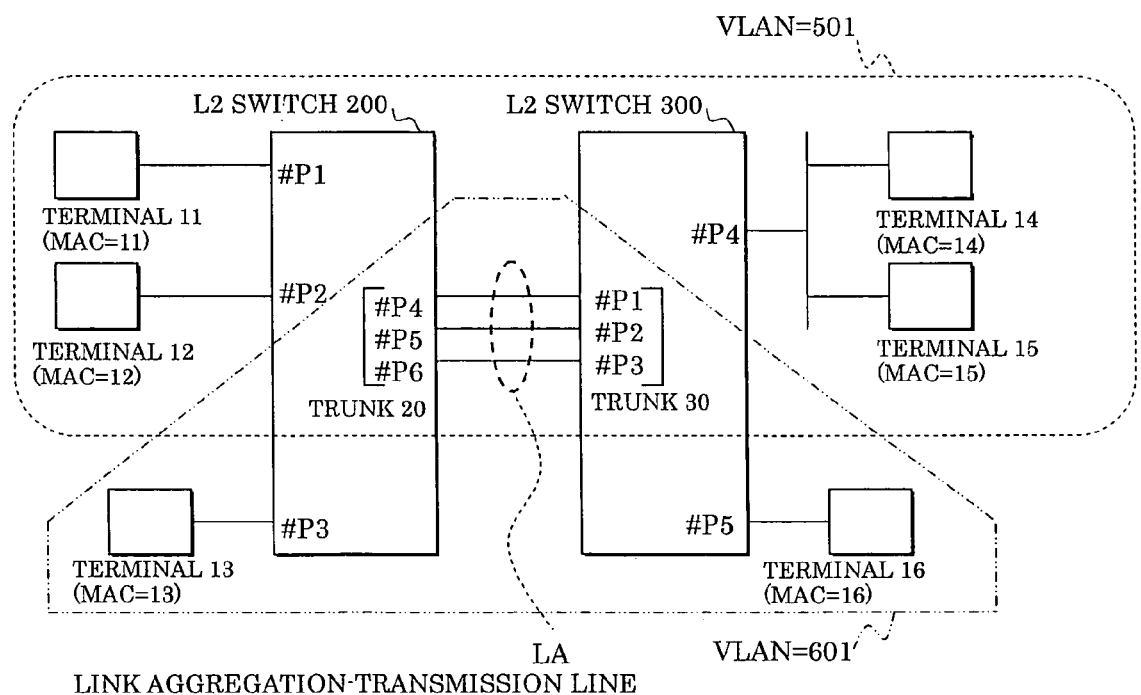
FIGS. 6A and 6B are format diagrams of a conventionally known MAC frame.
FIG. 7 is a diagram showing a conventionally known network arrangement (2)

As an arrangement of a network to which the present invention is applied, FIG. 7 already described can be mentioned similarly. The arrangements of terminals, VLANs and a link aggregation to which the terminals belong are the same as those having been already described referring to FIG. 7, wherein the logical link aggregation-transmission line LA binding three physical ports exists. The logical link aggregation-transmission line LA belongs to both VLANs 501 and 601, and frames of both VLANs 501 and 601 are transferred. Which VLAN the frame flowing through the logical link aggregation-transmission line LA belongs to is indicated by using a frame with a VLAN tag shown in FIG. 6B. The transmitting side of the logical link aggregation-transmission line LA inserts the VLAN tag into a frame upon outputting the frame, and the receiving side deletes the VLAN tag after identifying the VLAN.

Firstly, an example of frame transfer processing by the L2 switch 200 will now be described by referring to the flowchart shown in FIG. 1.

The terminal 11 transmits a frame with a format shown in FIG. 6A in which a destination address=14 and a source address=11. The L2 switch 200 monitors the frame reception at step S1 to receive the frame at the port #P1 (at step S2). Setting for associating the reception port with the VLAN-ID in the L2 switch 200 is the same as the above-mentioned table T104.

At step S3, the VLAN to which the frame belongs is obtained by using the table T104. Since the table T104 indicates that the frame received at the port #P1 belongs to the VLAN of the VLAN-ID=501, the VLAN-ID=501 is derived at step S3. At step S4, No. "1" of the port having received the frame is learned with the VLAN-ID derived at step S3 and the source address of the frame as keys. The result of the learning is entered as shown in the above-mentioned table T103.

At step S5, it is searched whether or not the port No. has been learned with the VLAN-ID of the received frame and the destination address as keys. For this search, the table T103 is used again. Since it has not been learned yet at the moment, no hit is found, so that the process proceeds from step S6 to step S7.

At step S7, the following table T111 is referred to in order to check the ports composing the VLAN.

TABLE T111

| VLAN-ID | BITMAP OF PORT |
|---|---|
| . | . |
| . | . |
| . | . |
| 501 | 110111 |
| . | . |
| . | . |
| . | . |
| 601 | 001111 |
| . | . |
| . | . |
| . | . |

This table T111 has the same arrangement as the tables T101 and T105 already described, which is preset for indicating a flooding destination for every VLAN. While only a single port is set as the flooding destination within the ports composing the link aggregation-transmission line LA in the table T105, "1" is set to all of the ports within the concerned trunk as the flooding destination in the above-mentioned table T111. This is different from the prior art example described above. Namely, the bitmap of the ports corresponding to the VLAN-ID=501 is obtained, so that it is indicated that the ports #P1, #P2, #P4, #P5, and #P6 belong to the VLAN 501.

At step S8-1, a frame is outputted from the obtained ports one after another. However, a frame is not outputted from a port having received the frame. Accordingly, a frame is not outputted from the first port #P1. When the obtained flooding destination port is different from the port having received the frame, the setting of "flooding enable" of the port is checked by the following table T112.

TABLE T112

| PORT NO. | FLOODING ENABLE* |
|---|---|
| 1 | 1 |
| 2 | 1 |
| 3 | 1 |
| 4 | 1 |
| 5 | 0 |
| 6 | 0 |

BEFORE PORT 4 FAILS
*FLOODING ENABLE (0: DISABLE, 1: ENABLE)

This table T112 is preset as follows: When the physical port is used as normal port, "1" is always set as "enable". When it is used as a port of the link aggregation-transmission line LA, ports composing the link aggregation-transmission line LA in which no failure occurs are arranged in the ascending order, and enable "1" is preset to only the top port. Thus, it is possible to use a table having an arrangement of the table T106 already described for determining a port. In the example of the table T112, only the port #P4 is enabled among the trunk 20.

Thus, the frames are outputted from the ports #P2 and #P4 by steps S8-1-S8-3 and S9. Since it is recognized that for the port #P4 the VLAN tag is to be inserted into the frame from the table T104, it is inserted into the outputted frame. As a result, the frame is transferred to the L2 switch 300 located ahead of the port #P4.

The output of the frame from the L2 switch 300 to the terminal 14 is basically the same operation as that already described. However, as for the operation of the L2 switch 300, step S8-2 within the operation of the L2 switch 200 mentioned above referring to FIG. 1 is different, in which the following table T112a is used.

TABLE T112a

| PORT NO. | FLOODING ENABLE* |
|----------|------------------|
| 1 | 1 |
| 2 | 0 |
| 3 | 0 |
| 4 | 1 |
| 5 | 1 |

*FLOODING ENABLE (0: DISABLE, 1: ENABLE)

Namely, the frame outputted from the port #P4 of the L2 switch 200 is received at the port #P1 of the L2 switch 300. Since the frame is outputted to the ports #P4 and #P5 of "flooding enable" which are not reception ports based on the above table T112a, the frame transmitted by the terminal 11 can be received by the terminal 14.

Figure 1:
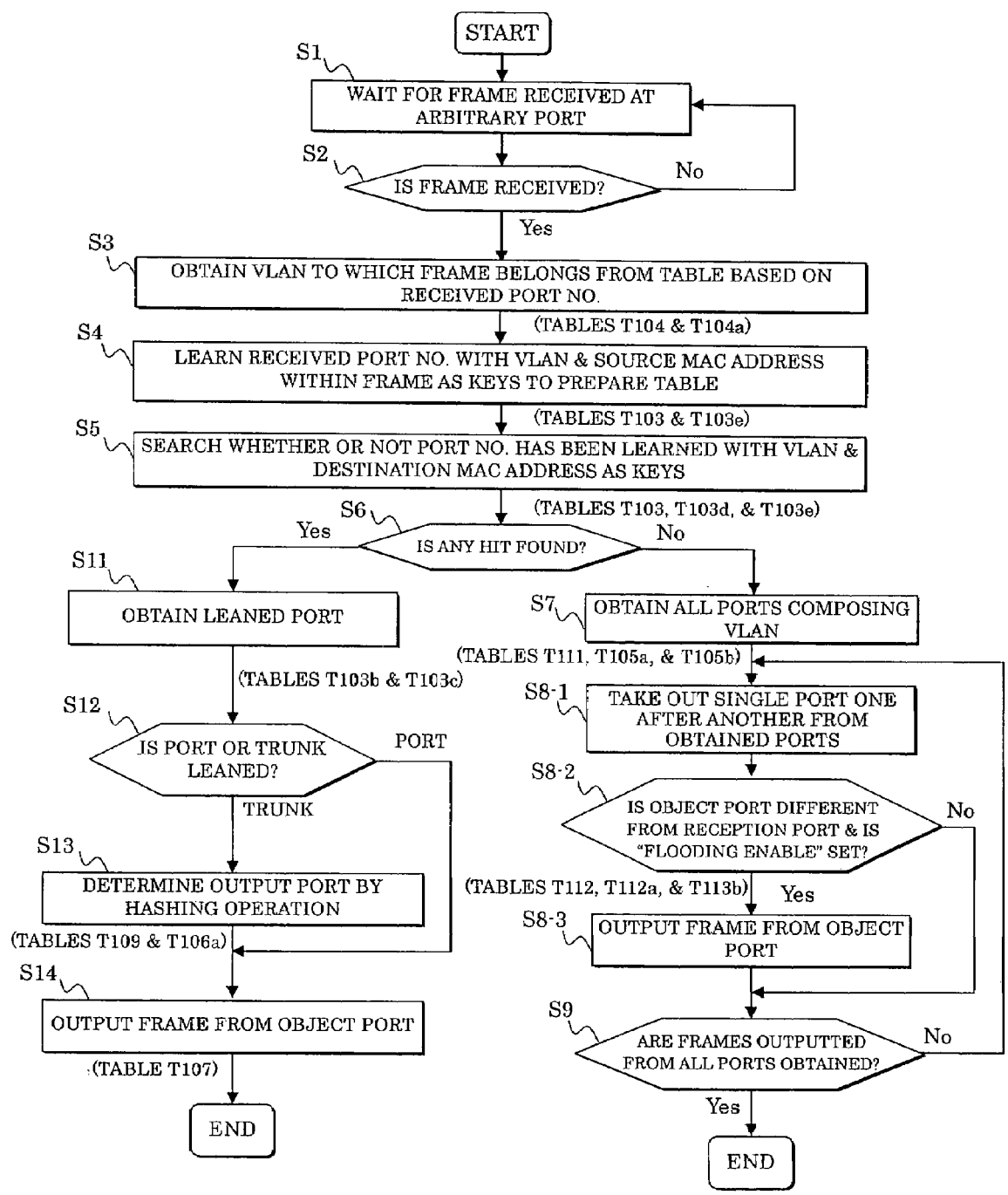
FIG. 1 is a flowchart of frame transfer processing in network arrangements (2) and (3) of the present invention.
Figure 8:
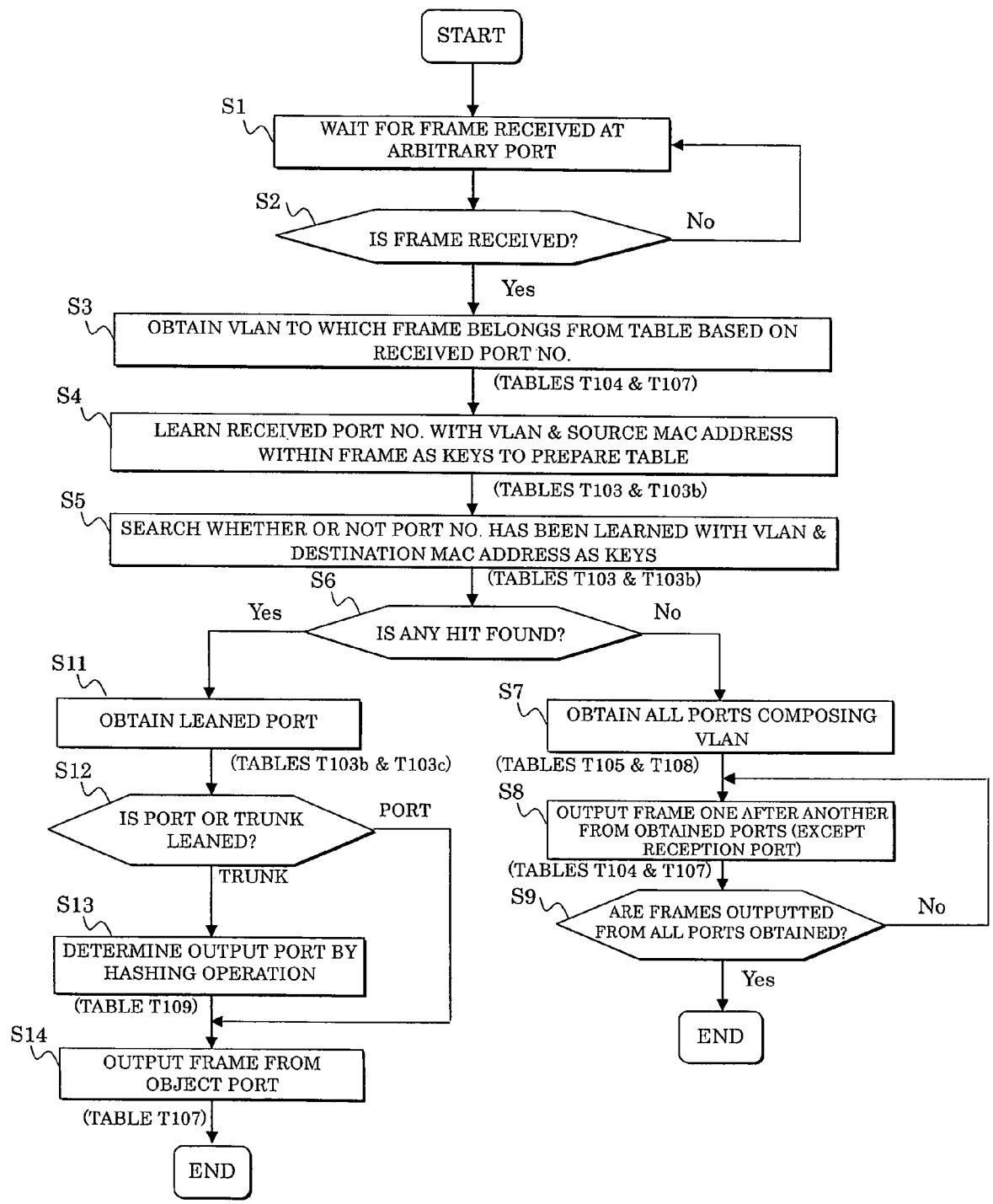
FIG. 8 is a flowchart of frame transfer processing by a conventional L2 switch in a network arrangement (2)
Figure 9:
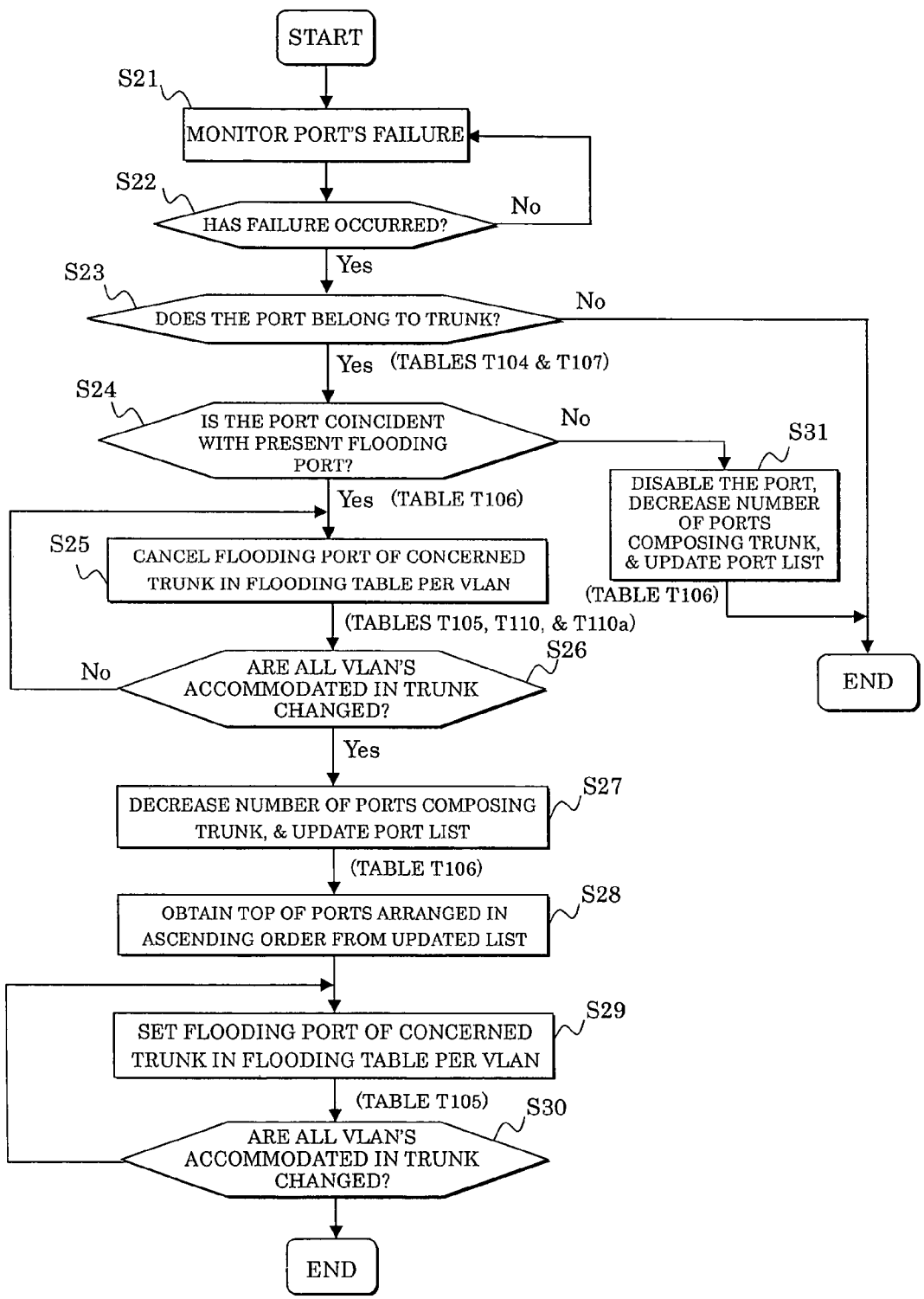
FIG. 9 is a flowchart of conventional processing when a failure occurs at a port of a trunk and a flooding port is changed in a network arrangement (2)

Steps S11-S14 of FIG. 1 indicate processings in a case where the destination address has already been learned. Since they are the same as the processing of FIG. 8 already described, the description will be omitted.

The processing in a case where a failure occurs in the flooding port, communication is disabled, and setting is changed so as to perform the flooding from another port will now be described referring to the flowchart of FIG. 2.

The L2 switch 200 monitors a port's failure at steps S21 and S22, so that it is supposed that a failure has occurred at the port #P4 in the L2 switch 200 shown in FIG. 7. At step S23, whether or not the port belongs to a trunk is checked. For this purpose, the above table T104 is referred to. When the port belongs to the trunk, whether the port is coincident with the flooding port is checked by the entry of the following table T106a.

TABLE T106a

| TRUNK NO. | NUMBER OF PORTS | PORT LIST | FLOODING PORT |
|-----------|-----------------|-----------|---------------|
| . | . | . | . |
| . | . | . | . |
| 20 | 3 | 4, 5, 6 | 4 |
| . | . | . | . |
| . | . | . | . |

When the port #P4 has failed, the port is coincident with the top of the ports arranged in the ascending order, whereby it is recognized that the port is the flooding port, so that "disable" is set to the entry corresponding to the port #P4 of the table T112 at step S41 as shown by the following table T113.

TABLE T113

| PORT NO. | FLOODING ENABLE* |
|----------|------------------|
| 1 | 1 |
| 2 | 1 |
| 3 | 1 |
| 4 | 0 |
| 5 | 1 |
| 6 | 0 |

AFTER PORT 4 FAILS
*FLOODING ENABLE (0: DISABLE, 1: ENABLE)

It is to be noted that in the case of the L2 switch 300, the setting is performed as shown by the following table T113a.

TABLE T113a

| PORT NO. | FLOODING ENABLE* |
|----------|------------------|
| 1 | 1 |
| 2 | 0 |
| 3 | 0 |
| 4 | 1 |
| 5 | 1 |

*FLOODING ENABLE (0: DISABLE, 1: ENABLE)

At step S42, the number of ports is changed to "2" in the entry corresponding to the trunk 20 of the table T106, and the port #P4 is deleted from the port list.

At step S43, the top port after the updating is obtained, and at step S44, the port #P5 is set to flooding "enable" as shown by the above table T113.

Thus, the port #P5 operates as a new flooding destination.

When the failed port is not coincident with the flooding port at step S24, the flooding port remains available. Therefore, the process proceeds to step S31, the number of ports is reduced in the entry corresponding to the trunk 20 of the table T106, and the failed port is deleted from the list.

Thus, in order to change the flooding port, the change per VLAN is not required different from the conventional technology, but the table T112 has only to be changed to the table T113. Even if the trunk belongs to numerous VLANs, the time required for changing is minimized, and the number of frames discarded while the flooding port is being changed can be extensively reduced.

Operational Embodiment for Network Arrangement (3) (Problem 2)

Figure 10:
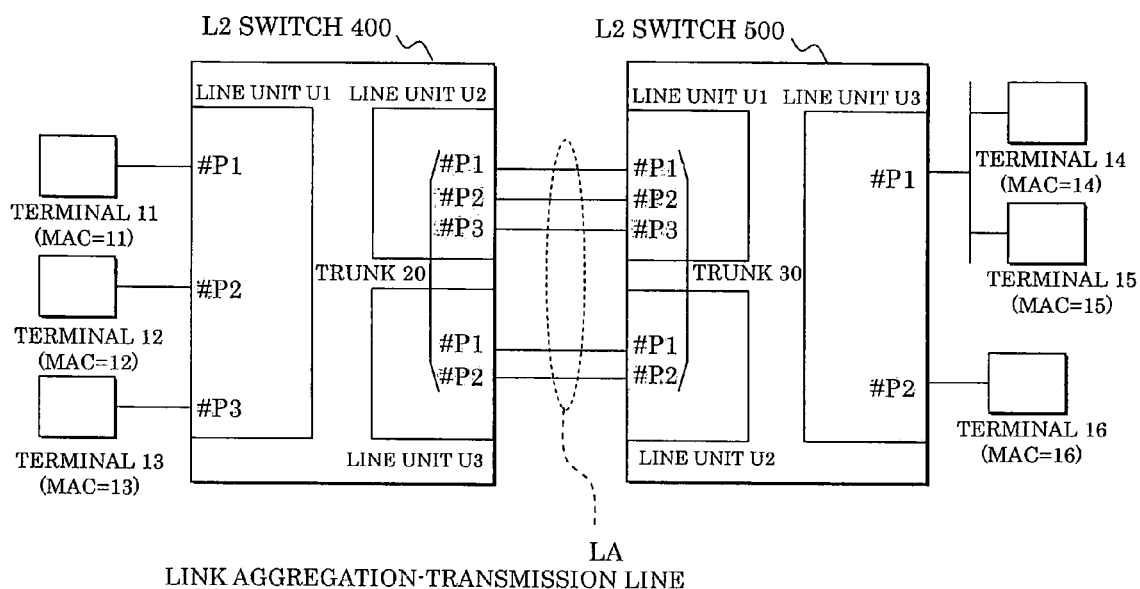
FIG. 10 is a block diagram showing a conventionally known network arrangement (3).

As an arrangement of another network to which the present invention is applied, the arrangement of FIG. 10 already described can be mentioned similarly. The arrangements of the terminals and the VLANs to which the terminals belong are the same as those of FIG. 10. The L2 switches 400 and 500 are respectively composed of three line units U1-U3, the ports #P1-#P3 of the line unit U2 and the ports #P1 and #P2 of the line unit U3 in the L2 switch 400 compose the trunk 20, and the ports #P1-#P3 of the line unit U1 and the ports #P1 and #P2 of the line unit U2 in the L2 switch 500 compose the trunk 30. The trunks 20 and 30 are connected with the link aggregation-transmission line LA.

Firstly, the frame transfer processing by the L2 switches 400 and 500 in the network arrangement (3) is also performed alone the flowchart of FIG. 1. This transfer processing is different from that by the L2 switches 200 and 300 in the above-mentioned network arrangement (2) in that the following table T103d is used at step S5 of FIG. 1 for the L2 switch 400.

TABLE T103d

| VLAN-ID | MAC ADDRESS | LINE UNIT/ PORT/TRUNK NO. | PORT/TRUNK IDENTIFICATION (0: PORT, 1: TRUNK) |
|---|---|---|---|
| . | . | . | . |
| . | . | . | . |
| . | . | . | . |
| 501 | 11 | 0101 | 0 |
| . | . | . | . |
| . | . | . | . |
| 501 | 14 | 20 | 1 |
| . | . | . | . |
| . | . | . | . |
| . | . | . | . |

Namely, in the table T103d, the port, line unit or trunk No. is set instead of the port No. in the table T103, and a code ("0"/"1") of the port/trunk identification is set to be referred to.

Also, at step S7, the following table T105a is used.

TABLE T105a

| | BITMAP OF LINE UNIT/PORT | | |
|---|---|---|---|
| VLAN-ID | LINE UNIT U1 | LINE UNIT U2 | LINE UNIT U3 |
| . | . | . | . |
| . | . | . | . |
| . | . | . | . |
| 501 | 110 | 111 | 11 |
| . | . | . | . |
| . | . | . | . |
| 601 | 001 | 111 | 11 |
| . | . | . | . |
| . | . | . | . |
| . | . | . | . |

Namely, in this table T105a, the bitmap of the line unit or port is set instead of the bitmap of the port in the table T111 to be referred to. As for the line unit U2, for example, it is indicated that ports #P1-#P3 belong to the VLAN 501.

Also, as for the L2 switch 500, the following table T104a is used at step S3 of FIG. 1.

TABLE T104a

| UNIT NO. & PORT NO. | VLAN-ID ALLOCATED TO RECEIVED FRAME* | PORT/TRUNK IDENTIFICATION (0: PORT, 1: TRUNK) | TRUNK NO. |
|---|---|---|---|
| 0101 | 0 | 1 | 30 |
| 0102 | 0 | 1 | 30 |
| 0103 | 0 | 1 | 30 |
| 0201 | 0 | 1 | 30 |
| 0202 | 0 | 1 | 30 |
| 0301 | 501 | 0 | 0 |
| 0302 | 601 | 0 | 0 |

This is a table corresponding to the table T104 concerning the L2 switch 400.

Also, the following table T103e is used at steps S4 and S5.

TABLE T103e

| VLAN-ID | MAC ADDRESS | LINE UNIT/ PORT/TRUNK NO. | PORT/TRUNK IDENTIFICATION (0: PORT, 1: TRUNK) |
|---|---|---|---|
| . | . | . | . |
| . | . | . | . |
| . | . | . | . |
| 501 | 11 | 30 | 1 |
| . | . | . | . |
| . | . | . | . |
| 501 | 14 | 0301 | 0 |
| . | . | . | . |
| . | . | . | . |
| . | . | . | . |

This corresponds to the above-mentioned table T103d.

Also, the following table T105b is used at step S7.

TABLE T105b

| | BITMAP OF LINE UNIT/PORT | | |
|---|---|---|---|
| VLAN-ID | LINE UNIT U1 | LINE UNIT U2 | LINE UNIT U3 |
| . | . | . | . |
| . | . | . | . |
| . | . | . | . |
| 501 | 111 | 11 | 10 |
| . | . | . | . |
| . | . | . | . |
| 601 | 111 | 11 | 01 |
| . | . | . | . |
| . | . | . | . |
| . | . | . | . |

This corresponds to the above-mentioned table T105a.

Also, the following table T113b is used at step S8-2.

TABLE T113b

| UNIT NO.& PORT NO. | FLOODING ENABLE* |
|---|---|
| 0101 | 1 |
| 0102 | 0 |
| 0103 | 0 |
| 0201 | 0 |
| 0202 | 0 |
| 0301 | 1 |
| 0302 | 1 |

*FLOODING ENABLE (0: DISABLE, 1: ENABLE)

The following table T106a is used at step S13.

TABLE T106a

| TRUNK NO. | NUMBER OF PORTS | PORT LIST | FLOODING PORT |
|---|---|---|---|
| . | . | . | . |
| . | . | . | . |
| . | . | . | . |
| 30 | 5 | 0101, 0102, 0103, 0201, 0202 | 0101 |
| . | . | . | . |
| . | . | . | . |
| . | . | . | . |

It is noted that the tables in the L2 switch 400 corresponding to the above-mentioned tables T113b and T106a are omitted in the above and FIG. 1.

The operation on the side of the L2 switch 400 when a failure has occurred in the line unit U1 of the L2 switch 500 will now be described referring to the flowchart of FIG. 2. Also, as the table managing the port of the trunk, the following table T114 is used.

TABLE T114

|  | TRUNK NO. | NUMBER OF PORTS | PORT LIST* | FLOODING PORT |
|---|---|---|---|---|
| BEFORE DETECTING FAILURE OF PORT #P1 IN LINE UNIT U2 | . . 20 . . | . . 5 . . | . . 0201, 0202, 0203, 0301, 0302 . . | . . 0201 . . |

*UPPER 2 DIGITS = LINE UNIT NO.; LOWER 2 DIGITS = PORT NO.

Although this table T114 is similar to the above-mentioned table T106, in the list of the port composing the trunk, each port is managed by the numerical values composed of the upper two digits for a unit No. and the lower two digits for a port No., whereby the flooding port indicating the flooding destination of the trunk can be stored. In this example, the state before the failure occurs in the line unit U1 of the L2 switch 500 is shown by the table T114.

The L2 switch 400 monitors the port's failure at step S21. Since detecting the failure per link when the failure occurs at the line unit U1 in the L2 switch 500, the L2 switch 400 specifically detects the failure at the port #P1 of the line unit U2 (at step S22).

At step S23, whether or not the port belongs to the trunk is checked. For the check, the entry of the following table T115 can be used.

TABLE T115

| UNIT NO. & PORT NO. | VLAN-ID ALLOCATED TO RECEIVED FRAME* | PORT/TRUNK IDENTIFICATION (0: PORT, 1: TRUNK) | TRUNK NO. |
|---|---|---|---|
| 0101 | 501 | 0 | 0 |
| 0102 | 501 | 0 | 0 |
| 0103 | 601 | 0 | 0 |
| 0201 | 0 | 1 | 20 |
| 0202 | 0 | 1 | 20 |
| 0203 | 0 | 1 | 20 |
| 0301 | 0 | 1 | 20 |
| 0302 | 0 | 1 | 20 |

When the port belongs to the trunk, whether or not the port is coincident with the flooding port is checked from the table T114 at step S24.

When the port #P1 of the line unit U2 fails, the port is coincident with the flooding port, based on the table T114. Therefore, at step S41, "disable" is set in the entry corresponding to the port #P1 of the line unit U2 in the following table T116 as shown in the following table T117.

TABLE T116

| UNIT NO.&PORT NO. | FLOODING ENABLE* |
|---|---|
| 0101 | 1 |
| 0102 | 1 |
| 0103 | 1 |

TABLE T116-continued

| UNIT NO.&PORT NO. | FLOODING ENABLE* |
|---|---|
| 0201 | 1 |
| 0202 | 0 |
| 0203 | 0 |
| 0301 | 0 |
| 0302 | 0 |

*FLOODING ENABLE (0: DISABLE, 1: ENABLE)

TABLE T117

| UNIT NO.&PORT NO. | FLOODING ENABLE* |
|---|---|
| 0101 | 1 |
| 0102 | 1 |
| 0103 | 1 |
| 0201 | 0 |
| 0202 | 0 |
| 0203 | 0 |
| 0301 | 1 |
| 0302 | 0 |

*FLOODING ENABLE (0: DISABLE, 1: ENABLE)

At step S42, the number of ports is changed to "4" in the entry corresponding to the trunk 20 in the table T114, and "0201" is deleted from the port list, thereby preparing the following table T118.

TABLE T118

|  | TRUNK NO. | NUMBER OF PORTS | PORT LIST* | FLOODING PORT |
|---|---|---|---|---|
| AFTER DETECTING FAILURE OF PORT #P1 IN LINE UNIT U2 | . . 20 . . | . . 4 . . | . . 0202, 0203, 0301, 0302 . . | . . 0301 . . |

*UPPER 2 DIGITS = LINE UNIT NO.; LOWER 2 DIGITS = PORT NO.

Figure 2:
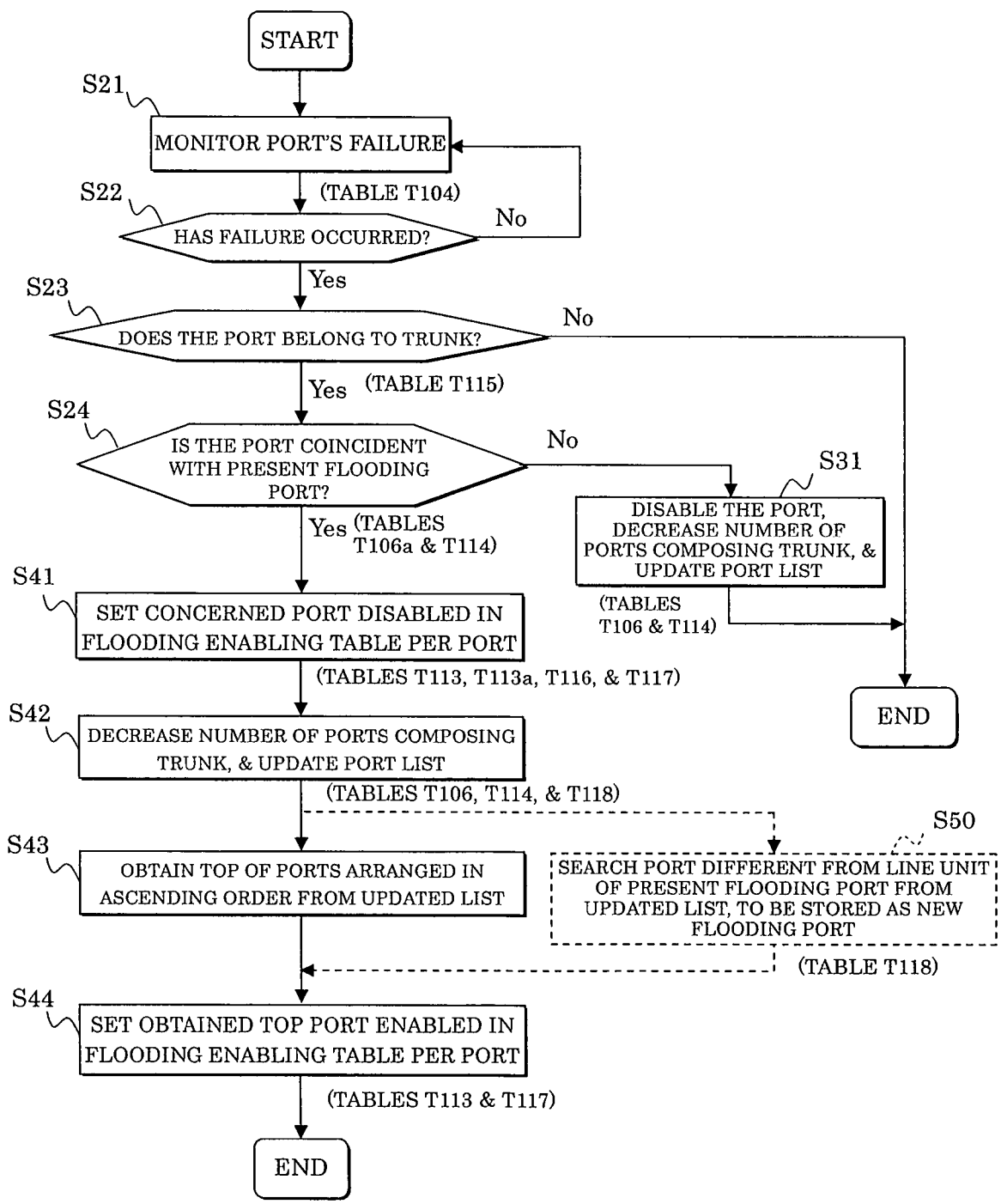
FIG. 2 is a flowchart of processing when a failure occurs in a port of a trunk and a flooding port is changed in network arrangements (2) and (3) of the present invention.
Figure 3:
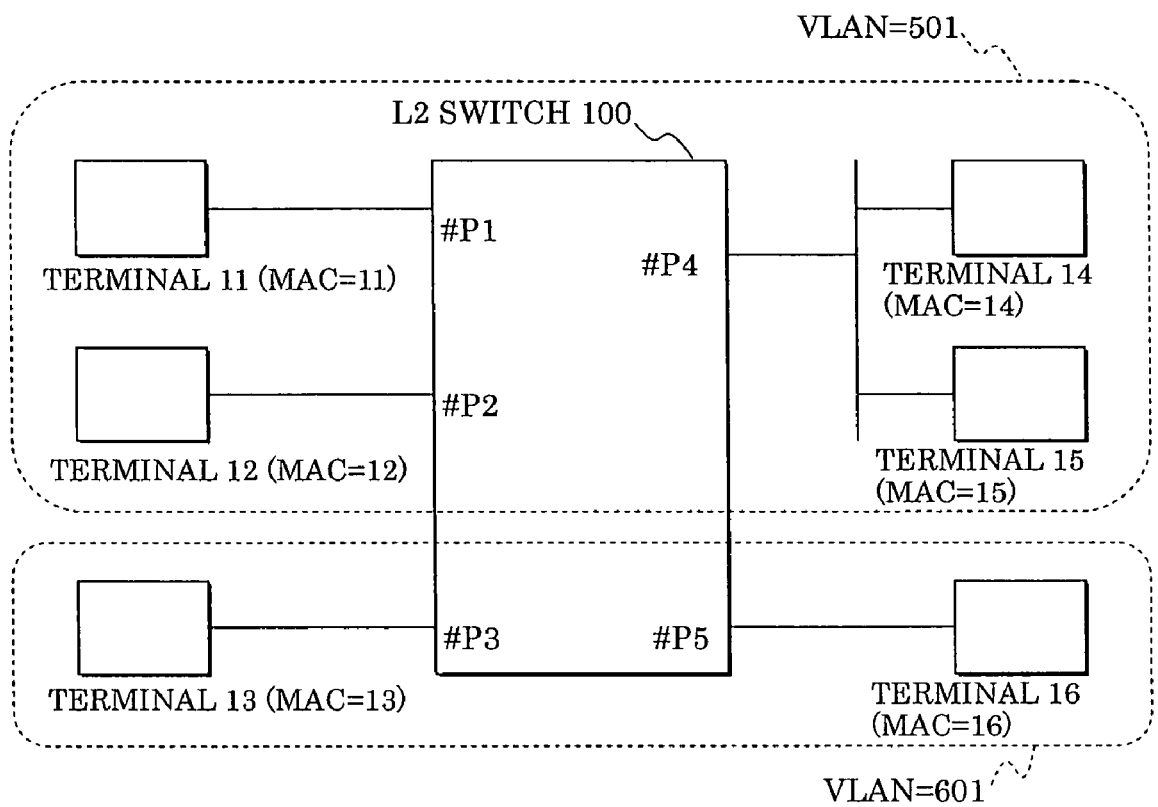
FIG. 3 is a block diagram showing a conventionally known network arrangement (1) using an L2 switch.
Figure 4A:
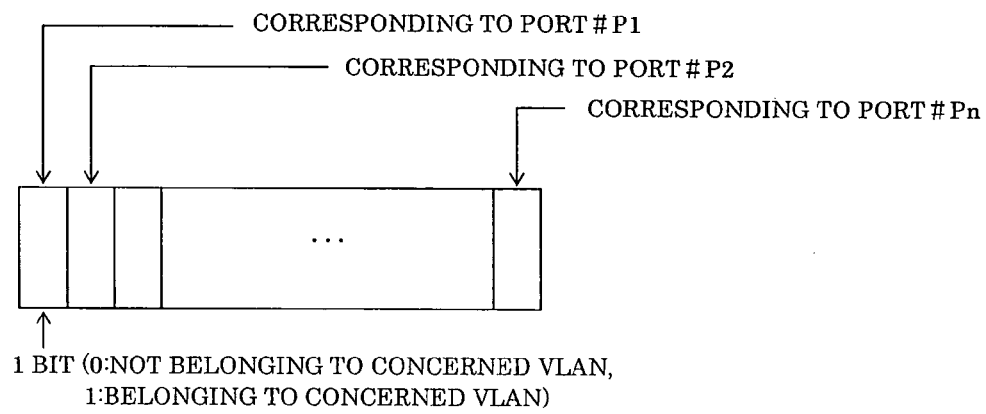
FIGS. 4A and 4B are diagrams showing an arrangement of a bitmap of a port in an L2 switch used in the present invention.
Figure 4B:
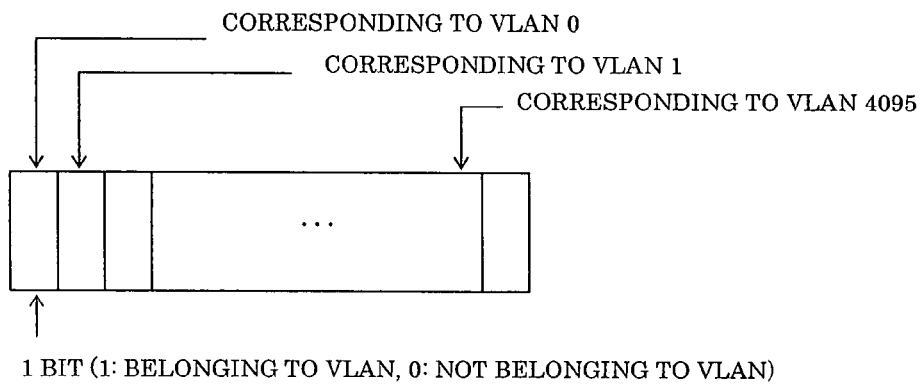
Figure 5:
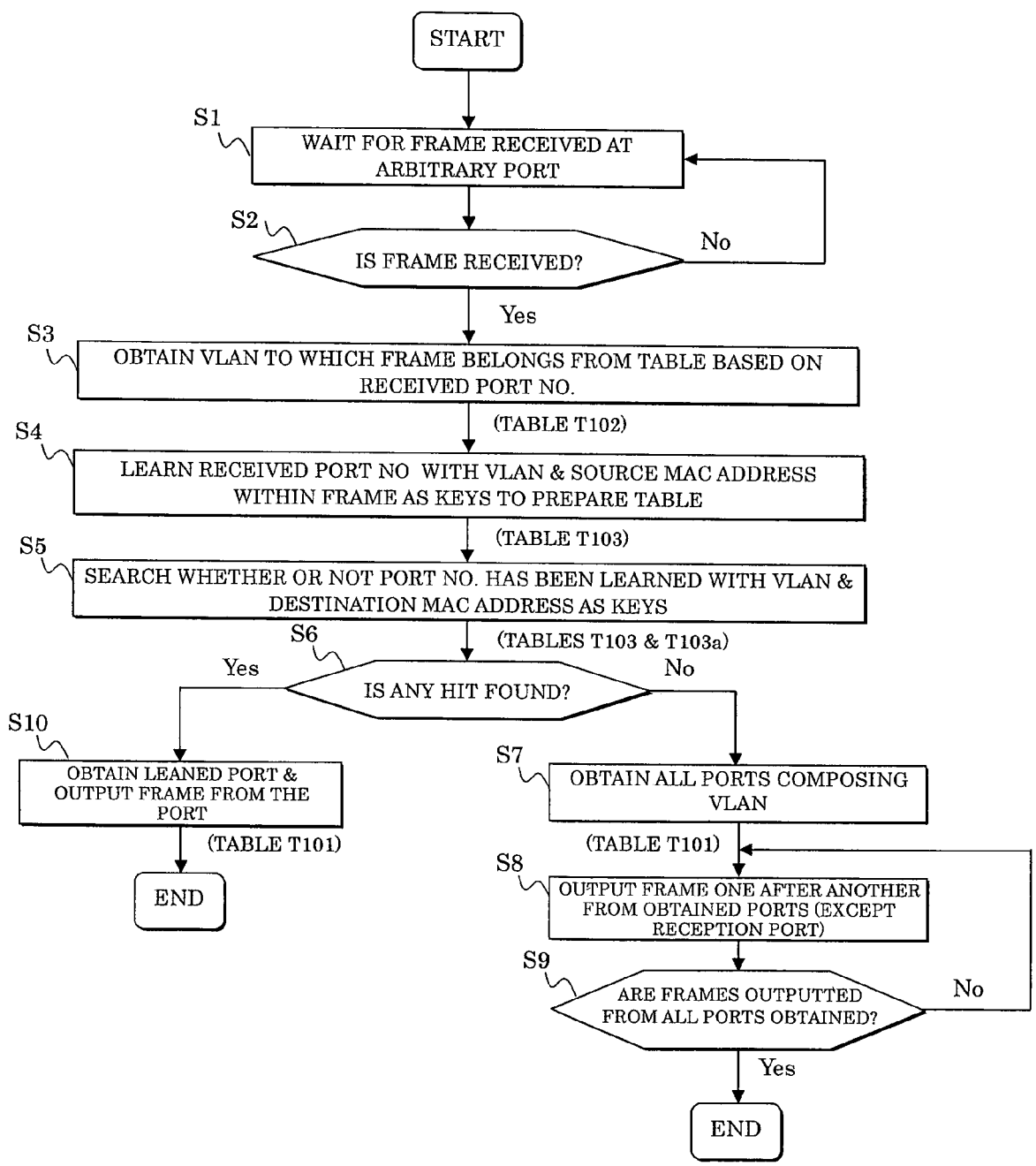
FIG. 5 is a flowchart of frame transfer processing by an L2 switch in a network arrangement (1)

As shown by dotted lines in FIG. 2, the port different from the line unit of the present flooding port is obtained based on the updated list at step S50, whereby the port #P1 of the line unit U3 is stored as a new flooding port as shown in the above-mentioned table T118.

As step S44, the port #P1 of the line unit U3 is set to flooding "enable" as shown in the above-mentioned table T117. Thus, the frame is outputted from the new flooding destination.

Since the failure has occurred in the line unit U1 in the L2 switch 500 in this example, the L2 switch 400 subsequently detects a failure at the port #P2 of the line unit U2 at steps S21 and S22 of the flowchart of FIG. 2. Since the failed port is not coincident with the flooding port at this time, it can be used as the flooding port. At this time, the process proceeds from step S24 to step S31, and the number of ports has only to be reduced and the failed port has only to be deleted from the port list in the entry corresponding to the trunk 20 of the table T114. Similarly, if a failure is detected at the port #P3 of the line unit U2 at step S21, the process has only to proceed to step S31, and no change of the flooding port is required.

Thus, by using a logic of selecting the port which becomes the next flooding port so as to shift across the line unit when the flooding port is changed, change of the flooding port can be completed only once upon an occurrence of a failure per line unit, so that the switching time can be minimized.

It is to be noted that the entry of each table of the L2 switch can be generally provided by a command from a supervisory control terminal, a software operation, or the like which operates on a CPU mounted on the switch.

What I claim is:

1. A frame transfer processing method for transferring a frame through a link aggregation-transmission line which aggregates a plurality of physical links connecting switches to be used as a single logical transmission line, comprising:
   a first step of setting a single physical link among the link aggregation-transmission line to be used for flooding for every physical link and every VLAN, upon accommodating a plurality of VLANs in the link aggregation-transmission line; and
   a second step of changing a flooding destination for a link upon failure of the specific link without changing the flooding destination for every VLAN, wherein
   the frame is transferred within a single network device through the link aggregation-transmission line and the switches comprise layer 2 switches.

2. The frame transfer processing method as claimed in claim 1, wherein the second step is further provided with a step of disabling the failed link when the failed link belongs to a trunk composing the link aggregation-transmission line and is a present flooding destination, and of setting another link composing the trunk as the flooding destination.

3. The frame transfer processing method as claimed in claim 1, wherein when each switch is composed of a plurality of line units, and the link aggregation-transmission line is used across a plurality of line units, the second step is farther provided with a step of disabling the failed link when the failed link belongs to a trunk composing the link aggregation-transmission line and is a present flooding destination, and of setting a link of another line unit as a link newly used for the flooding destination.

4. The frame transfer processing method as claimed in claim 2, wherein the second step is further provided with a step of decreasing a number of links composing the trunk by deleting the failed link upon setting the failed link disabled.

5. A frame transfer processing device for transferring a frame through a link aggregation-transmission line which aggregates a plurality of physical links connecting switches to be used as a single logical transmission line, comprising:
   a first means of setting a single physical link among the link aggregation-transmission line to be used for flooding for every physical link and every VLAN, upon accommodating a plurality of VLANs in the link aggregation-transmission line; and
   a second means of changing a flooding destination for a specific link upon failure of the specific link without changing the flooding destination for every VLAN, wherein
   the frame is transferred within a single network device through the link aggregation-transmission line and the switches comprise layer 2 switches.

6. The frame transfer processing device as claimed in claim 5, wherein the second means is further provided with means of disabling the failed link when the failed link belongs to a trunk composing the link aggregation-transmission line and is a present flooding destination, and of setting another link composing the trunk as the flooding destination.

7. The frame transfer processing device as claimed in claim 5, wherein when each switch is composed of a plurality of line units, and the link aggregation-transmission line is used across a plurality of line units, the second means is farther provided with means of disabling the failed link when the failed link belongs to a trunk composing the link aggregation-transmission line and is a present flooding destination, and of setting a link of another line unit as a link newly used for the flooding destination.

8. The frame transfer processing device as claimed in claim 6, wherein the second means is further provided with means of decreasing a number of links composing the trunk by deleting the failed link upon setting the failed link disabled.

* * * * *